Patented Jan. 15, 1952

2,582,278

UNITED STATES PATENT OFFICE 2,582,278

PROCESSING RUBBER

Spencer S. Prentiss, Bartlesville, Okla., assignor to Phillips Petroleum Company, a corporation of Delaware No Drawing. Application September 27, 1948, Serial No. 51,477

8 Claims. (Cl. 260—761)

This invention relates to processing rubber. In one of its more specific aspects it relates to breaking down and mixing rubber. In still another of its more specific aspects it relates to a method of breaking down and mixing rubber so as to form a more plastic rubber or rubber mix. In still another of its more specific aspects it relates to a method of breaking down and mixing rubber so as to form a rubber mix more easily handled in the calendering and tubing steps of rubber processing. In still another of its more specific aspects it relates to new rubber compositions.

In the manufacture of rubber products the usual processing steps employed are as follows: breaking down of rubber, mixing, storage of the mixed stock, calendering, tubing, preparing stock for curing and curing or vulcanizing. In some cases an aging period is introduced between the first two operations, that is, those operations of breaking down the rubber and of mixing the rubber into a rubber mix. Many rubber plants make the practice of keeping rubber on hand that has been broken down or premasticated under three standard sets of conditions; for example, the first (10 to 15 minutes) broken down just enough to allow the second processing step of mixing; the second (25–35 minutes) to be used where smooth calendering is desired, and the third (40–60 minutes) for use in frictions and cements. This breaking down or mastication step is usually carried out in either a Banbury mixer, Gordon plasticator or on a mill. After the rubber is broken down or masticated it is stored for future use in the mixing step during which operation the fillers, antioxidant, accelerator, vulcanizing agent, etc., are added. The broken down rubber and the various other compounding ingredients are then mixed together on a mill or in a Banbury mixer. The mixed stock is then stored and used as needed in the later processing steps of calendering or tubing. In connection with the discussion and disclosure herein, I use the term "rubber" as a generic term to cover both vulcanizable rubber from natural sources and that which is synthetically produced, such as copolymers of butadiene and styrene, polymeric diolefins, copolymers of diolefins and co-monomers containing the terminal group [$CH_2=C<$], and the like.

The rubber is usually broken down on a mill or in a Banbury mixer at a temperature in the range between 240° F. and 320° F., the high temperatures being used in a fairly widely used high-speed Banbury mixer. It has been shown that oxygen is indispensable to the plasticization of rubber by milling or treatment in a Banbury mixer. While a number of opinions of the nature of this action exist, it would appear that oxygen disaggregates colloidal micelles by producing a form of peptization. This peptizing action produces a softening without the necessity of additional and prolonged heating, which heating may of itself be deleterious. In general, the term "peptizing action" is understood to mean the transformation of a gel to a liquid, soluble form. In the case of peptizing rubber, some of the gel is solubilized, resulting in an increase of plasticity. Although such action is essential to the breaking down or mixing operation, it is equally essential that the action be prevented from continuing in an uncontrolled manner so as not to adversely effect the properties of the cured rubber. A reagent that will provide this control, that is, plasticizing the rubber so as to make it easier to process yet not adversely affect the properties of the finished product would be very valuable indeed.

I have discovered that organo-cobalt chelate compounds when added to rubber during the breaking down step or the mixing step of processing will aid in plasticization so that the rubber may be more easily handled in later stages of processing.

An object of this invention is to plasticize rubber.

Another object of this invention is to provide new rubber compositions.

Another object of this invention is to provide novel rubber compositions with improved properties and improved milling or mixing characteristics.

Still another object of this invention is to provide a method of breaking down or mixing rubber into a rubber mix so that the broken down rubber or rubber mix can be more easily handled in subsequent processing operations.

Other objects of this invention will become apparent, to one skilled in the art, from this disclosure.

I have found that organo-cobalt chelate compounds, which are known to absorb oxygen from air at relatively low temperatures at atmospheric and higher pressures and to give up such absorbed oxygen at relatively high temperatures at atmospheric and lower pressures, when added to rubber during the breaking down or mixing steps of processing will aid in plasticizing the rubber so as to make the broken down rubber or rubber mix more easily handled in subsequent processing operations.

In practicing my invention, I prefer to use a disalicylalethylene-cobalt chelate compound. A typical disalicylalethylene-cobalt chelate compound suitable to use in the practice of my invention is disalicylalethylenediimine-cobalt which has the structure,

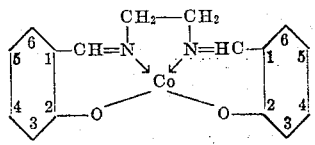

The above compound is commonly known by its proprietary name, "Salcomine." Derivatives of disalicylalethylenediimine-cobalt having substituents in the 3 and/or 5 positions of the nuclei are also suitable. Such substituents may include: hydroxy, alkoxy, alkyl, nitro, halogen and combinations of these groups; and when a plurality of substituents are present they may be like or unlike. While disalicylalethylenediimine-cobalt is the more practical reagent from the present standpoint and availability, 3-fluorodisalicylalethylenediimine-cobalt, 3-ethoxy-disalicylalethylenediimine-cobalt, and 3-methoxy-disalicylalethylenediimine-cobalt are somewhat more efficient as oxygen-absorbing and oxygen-desorbing agents. For this reason, they have a greater effect on aiding the plasticization of the rubber and on retarding vulcanization.

The chemistry of the preparation of the organo-cobalt chelate compounds of my invention is, in general, old in the art. Essentially the steps involved are, (1) reacting salicyaldehyde or an analog thereof with an aliphatic diamine such as ethylene diamine in an aqueous medium which is about 4.5 normal with respect to sodium hydroxide and which contains about 0.28 pound of sodium acetate trihydrate per pound of sodium hydroxide; (2) adding this solution to a dilute solution of cobaltous chloride (about 1.5 weight per cent) in dilute acetic acid (about 2 weight per cent) maintained at about 80° C.; and (3) collecting the reaction mixture and cooling, washing and drying the precipitated product.

In practicing my invention, I prefer to add organo-cobalt chelate compound in the form of a finely divided powder to the rubber during the breaking down or mixing steps of plant processing. However, the manner of its addition is usually not critical. It can be admixed with the other compounding ingredients during mixing or it may be added to the synthetic or natural rubber latex prior to coagulation of the rubber. The organo-cobalt chelate compounds which I use in my invention will absorb oxygen from the air and give up that oxygen at the temperature at which the rubber is broken down or mixed. Addition of the organo-cobalt chelate compound during the breaking down or mixing step will aid in peptizing the rubber so that upon standing the broken down rubber or mix will become more plastic, thus enabling one to more easily handle the rubber during the later steps of molding the rubber mix.

In practicing my invention I prefer to add the organo-cobalt chelate compound to the rubber while it is being broken down on a mill or in a Banbury mixer. I prefer to use from 0.2 to 2 parts per 100 parts of rubber, usually from 0.5 to 1.5 parts per 100 parts of rubber. My invention will work with either synthetic, natural or reclaimed rubber, the amount of organo-cobalt chelate compound added depending on the type and condition of the rubber. A reclaimed rubber stock will usually take less of the organo-cobalt chelate compound than first-used natural or synthetic rubber. I have found that the best way to practice my invention is to add the organo-cobalt chelate compound during the breaking down step of processing. After the rubber has been masticated in the breaking down step, it is allowed to stand or age before it is mixed with the other compounding ingredients in the mixing step. For certain rubbers the peptizing action which is believed to occur in practicing my invention begins to take effect after the broken down rubber has stood about 7 days. After approximately 7 days the rubber becomes more plastic and easier to mill. The broken down batch containing the organo-cobalt chelate compound can be tested to determine viscosity at given intervals after said 7 day induction period. For other types of rubber the induction period may be 2 to 3 days depending on the type of rubber, method of preparation, concentration of the organo-cobalt chelate compound, etc. The well-known Mooney Viscometer can be used to determine Mooney viscosity as a measure of plasticity. I have found that the addition of from 0.2 to 2, preferably 0.5 to 1.5, parts of the organo-cobalt chelate compound per 100 parts of rubber during the breaking down step will lower the Mooney viscosity from 20 to 40 per cent after an aging period of from 1 to 8 weeks. This reduction in Mooney viscosity and increase in plasticity is very advantageous in the subsequent processing steps of mixing and molding. While I prefer to add the organo-cobalt chelate compound during the breaking down stage of processing since the decrease in the Mooney viscosity will aid in the mixing step, I have found that my invention can also be practiced by adding the organo-cobalt chelate compound to the rubber during the mixing step, and upon aging the mixed stock, the Mooney viscosity will decrease so as to aid in the subsequent step of molding the rubber product prior to curing or vulcanizing. I the organo-cobalt chelate compound is added to the rubber during the mixing step an induction period of from 2 to 7 days is necessary before the peptizing action takes effect. If from 0.2 to 2, preferably 0.5 to 1.5, parts of the organo-cobalt chelate compound per 100 parts of rubber, is added during the mixing step of processing, I have found that the Mooney viscosity of the mixed stock will be lowered from 15 to 30 per cent after an aging period of from 5 days to 7 weeks.

Following is an example of my invention. The amount and type of additive and rubber and the Mooney viscosities given are not to unduly limit the scope of my invention.

*Example*

Two samples of Buna S-3 were mixed in a Midget Banbury mixer at 30 R. P. M. for 3 minutes each; one sample contained 1 PHR "Salcomine", and the other contained no "Salcomine." Buna S-3 used in the test was the copolymer produced at a temperature of 50° C.

from a polymerization reaction in which the following recipe was used:

| | Parts by weight |
|---|---|
| Butadiene | 70 |
| Styrene | 30 |
| H₂O | 106 |
| Diisopropyl xanthogen disulfide | 0.1 |
| Potassium persulfate | 0.4 |
| NaOH | 0.4 |
| The sodium salt of ditertiarybutylnaphthalene sulfonate | 3.0 |
| Paraffinic acid | 0.5 |
| Total | 210.4 |

The conversion was 58 per cent with a reaction time of 26 hours.

The following table gives the Mooney viscosity values which were determined at 0, 1, 4, 7, 15, 22, 35 and 42 days using the small rotor at 212° F.

*Mooney Data*

| Sample | M S 4 Days Aging at 80° F. | | | | | | | |
|---|---|---|---|---|---|---|---|---|
| | 0 | 1 | 4 | 7 | 15 | 22 | 35 | 42 |
| Buna S-3 | 87.3 | 85.0 | 84.8 | 83.2 | 83.0 | 82.4 | 79.1 | 80.0 |
| Buna S-3+1 PHR "Salcomine" | 92.6 | 92.0 | 92.4 | 92.0 | 85.5 | 80.6 | 69.6 | 67.2 |

The Mooney data in the above table indicate an induction period of about 7 days is required before the peptizing action of the "Salcomine" becomes effective, and that after this induction period, the "Salcomine" effects a rapid reduction in the Mooney value of the polymer. The results of the decrease of Mooney viscosity were plotted on a graph. An extrapolation of the resulting curve gave a Mooney viscosity of 62 at the end of 10 weeks and of 60 at the end of 14 weeks.

As will be evident to those skilled in the art, various modifications of this invention can be made, or followed, in the light of the foregoing disclosure and discussion without departing from the spirit or scope of the disclosure or from the scope of the claims.

I claim:

1. In the process of breaking down and mixing a vulcanizable rubber selected from the group consisting of natural rubber, polymeric diolefins and copolymers of diolefins and comonomers containing the terminal group $CH_2=C<$ into a rubber milk prior to molding and vulcanizing said mix, that improvement which comprises adding to said rubber from 0.2 to 2 parts per 100 parts of rubber of a disalicylal-ethylenediimine-cobalt.

2. In the process of breaking down and mixing a vulcanizable rubber selected from the group consisting of natural rubber, polymeric diolefins and copolymers of diolefins and comonomers containing the terminal group $CH_2=C<$ into a rubber mix prior to molding and vulcanizing said mix, that improvement which comprises adding from 0.5 to 1.5 parts per 100 parts of rubber of disalicylalethylene-diimine-cobalt to said rubber.

3. In the process of breaking down natural rubber, that improvement which comprises adding from 0.5 to 1.5 parts per 100 parts of rubber of disalicylalethylenediimine-cobalt to said natural rubber.

4. A composition of matter comprising, natural rubber and from 0.5 to 1.5 parts of disalicylalethylenediimine-cobalt per one hundred parts of rubber.

5. A composition of matter comprising, a vulcanizable copolymer of butadiene and styrene and from 0.2 to 2 parts of a disalicylalethylenediimine-cobalt chelate compound per 100 parts of said copolymer.

6. A composition of matter comprising, a vulcanizable rubber selected from the group consisting of natural rubber, polymeric diolefins and copolymers of diolefins and comonomers containing the terminal group $CH_2=C<$ and 0.2 to 2 parts per 100 parts of said rubber of a disalicylalethylenediimine-cobalt.

7. In the process of breaking down and mixing a vulcanizable rubber selected from the group consisting of natural rubber, polymeric diolefins and copolymers of diolefins and comonomers containing the terminal group $CH_2=C<$ into a rubber mix prior to molding and vulcanizing said mix, that improvement which comprises, adding 0.2 to 2 parts per 100 parts of said rubber of a disalicylalethylenediimine-cobalt to said vulcanizable rubber.

8. In the process of breaking down and mixing a vulcanizable copolymer of butadiene and styrene, that improvement which comprises, adding a small quantity of disalicylalethylenediimine-cobalt to said copolymer of butadiene and styrene.

SPENCER S. PRENTISS.

REFERENCES CITED

The following references are of record in the file of this patent:

UNITED STATES PATENTS

| Number | Name | Date |
|---|---|---|
| 2,310,449 | LightBown et al. | Feb. 9, 1943 |
| 2,346,755 | Hemming | Apr. 18, 1944 |
| 2,368,880 | Reiff et al. | Feb. 6, 1945 |
| 2,380,299 | Evans | July 10, 1945 |
| 2,416,667 | Schroeder | May 4, 1947 |